United States Patent Office 3,331,010
Patented July 11, 1967

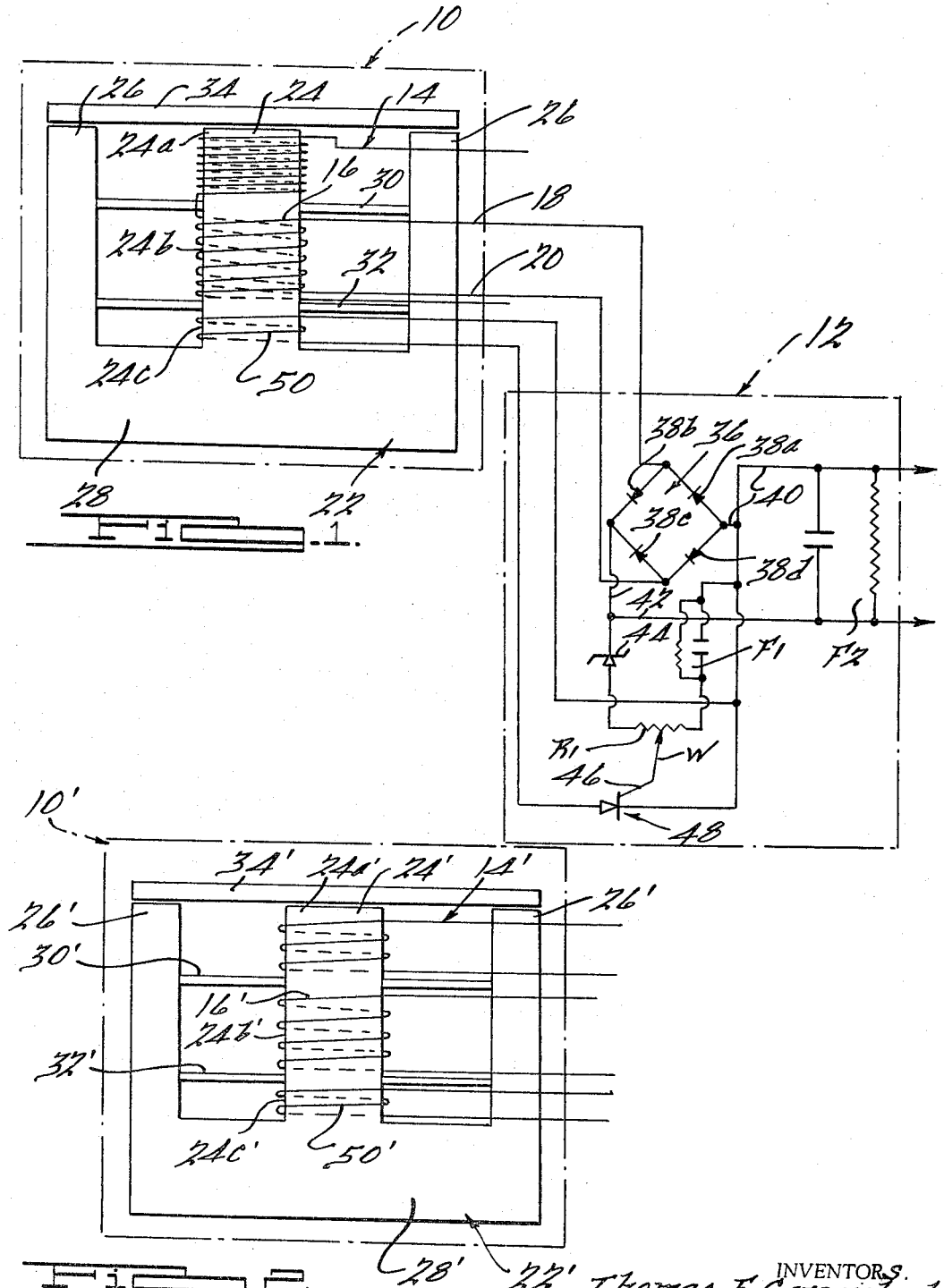

3,331,010
REGULATED TRANSFORMER
Thomas F. Carmichael, Drayton Plains, and Renaldo M. Beltramo, Royal Oak, Mich., assignors to Syncro Corporation, Oxford, Mich., a corporation of Michigan
Filed July 19, 1963, Ser. No. 296,285
12 Claims. (Cl. 321—16)

This invention relates generally to voltage regulators and more particularly to an electrical device for providing a substantially constant output potential from a source of input potential.

There are many instances in which a substantially constant potential is required regardless of line fluctuations and/or changes in load; therefore, it is an object of this invention to provide a novel voltage regulator circuit for providing an output potential of substantially constant magnitude regardless of fluctuations of potential at the source and/or changes in the magnitude of the load.

It is another object of this invention to provide a novel voltage regulator circuit operable from a source of alternating potential to provide a direct potential output having a substantially constant average magnitude regardless of fluctuations in the potential at the source and/or changes in the magnitude of the load.

The electrical device of this invention utilizes a novel transformer construction which itself has voltage regulating characteristics. Therefore, it is another object of this invention to provide a novel transformer having voltage regulating characteristics.

Other objects, features, and advantages of the present invention will become apparent from the subsequent description and the appended claims, taken in conjunction with the accompanying drawings, in which:

FIGURE 1 is a schematic diagram of an electrical circuit embodying the features of this invention in which a preferred embodiment of the transformer of this invention is shown in a conventional plan view, and FIGURE 2 is a plan view of a modified transformer for use with the circuit of FIGURE 1 in place of the transformer shown in FIGURE 1.

In general, the voltage regulator of this invention automatically regulates the magnitude of the potential applied to a load circuit. The regulator is operable from a source of alternating potential and has a transformer having an input or primary circuit connected to the source and an output or secondary circuit connected to the input of a regulating circuit. The regulating circuit converts the alternating potential to a direct potential and has an output load circuit connected to a load circuit. The regulating circuit has a control circuit which is responsive to the magnitude of the potential at the output load circuit and is operatively connected to the transformer whereby variations in the potential at the output load circuit are automatically compensated at the transformer resulting in a substantially constant potential to the load. As will be seen, some voltage regulation automatically is provided by the transformer.

Looking more specifically now to FIGURE 1, a transformer assembly 10 is electrically connected to a regulating circuit 12. The transformer assembly 12, which is a step-down transformer, has a primary winding 14 connected to a suitable source of alternating current potential (not shown) and has a secondary winding 16 having a pair of output terminals 18 and 20. The primary winding 14 acts as an input circuit for a source of alternating potential while the secondary winding 16 provides an output circuit therefor. The transformer assembly 10 has a shell-type core 22 made of a material having a high permeability and with the primary and secondary windings 14 and 16, respectively, being located upon a center leg 24. The core 22 has a pair of outer legs 26; the legs 24 and 26 are connected together at one end by means of a crosspiece 28. A pair of magnetic shunts 30 and 32 extend between the center leg 24 and the outer legs 26 and substantially divide the center leg 24 into three portions indicated as 24a, 24b, and 24c, with the portion 24c located proximate to crosspiece 28. The secondary winding 16 is located completely on the portion 24b while the primary winding 14 is split and has a portion of its winding located upon the portion 24a and the remainder located on the portion 24b. This serves a purpose to be described. The ends of the leg portions 24 and 26 opposite the crosspiece 28 are magnetically coupled together by a separate crosspiece 34; a slight air gap is provided between each of the leg portions 24, 26 and the separate crosspiece 34.

The transformer assembly 10 has inherent voltage regulation characteristics. The shunt 30 is selected to be at or near saturation at the rated voltage and current of the transformer assembly 10. Thus as the voltage from the source, as applied to the primary winding 14, tends to increase, the lines of flux transmitted through the center leg portion 24 tend to increase. Without regulation this would result in an increase in the magnitude of the potential at the secondary. However, with the transformer assembly 10, as the shunt 30 approaches saturation it acts more as an air gap to additional lines of flux; thus the coupling between the two portions of the primary coil 14 increases resulting in an increase in the value of the inductance of the entire winding 14. This, of course, increases the inductive reactance of the primary circuit and results in a decrease in primary current. The reduced current generates less lines of flux resulting, in turn, in a lower induced voltage in the secondary 16. The overall effect is to regulate the voltage appearing at the secondary winding 16. The converse is true as the voltage to the primary 14 drops in magnitude. In a preferred embodiment the portion of the primary winding 14 located upon the portion 24a of the center leg 24 was selected to have approximately three times the number of turns as that portion of the primary winding 14 which was located about that portion 24b of the center leg 24. In this regard it should be noted that the number of turns shown in the drawing is only representative since the actual number for both primary and secondary is in the hundreds. The air gap provided between the separate cross member 36 and the leg portions 24, 26 prevents saturation of the main portions of the magnetic core 22 (i.e., leg portions 24, 26 and cross-pieces 28 and 34). As will be noted later, the regulator of this invention is designed to have its operating point, or point at which no regulation is required, proximately at the low end of the range of expected voltage variations and hence will be normally regulating from a higher voltage to a lower voltage. The shunt 30 is selected whereby the transformer assembly 10 regulates over this range in the manner previously described.

The regulator circuit 10 has a full wave rectifier 36 which has an input load circuit having one side connected directly to the output conductor 18 and having the other side connected directly to the output conductor 20. The full wave rectifier bridge 36 is of a conventional construction and is comprised of four diodes 38a–38d connected in a manner shown in FIGURE 1 for full wave rectification of the alternating potential applied thereto. Thus the input load circuit has one side at the juncture of diodes 38a and 38b and the other side at the juncture of diodes 38c and 38d.

The rectifier bridge 36 has an output load circuit which has one side of the juncture of diodes 38b and 38c and the other side at the juncture of diodes 38a and 38d; a pair of output conductors 40 and 42 are connected to the one and other side, respectively, of the output load circuit. Thus, when an alternating potential is applied to the primary winding 14 of the transformer assembly 10, this potential is stepped down via the secondary winding 16; this stepped down potential is applied to the input load circuit at the full wave rectifier 36; the rectifier 36 provides at its output load circuit a pulsating, direct potential having an average magnitude depending upon the magnitude of the alternating potential applied to the input load circuit. The conductors 40 and 42 from the output load circuit can be connected to a suitable load (not shown).

In order to regulate the mignitude of the direct potential at the output load circuit of the full wave rectifier bridge 36 a control circuit is provided which is operatively associated with the transformer assembly 10 in response to the magnitude of the potential appearing at the output load circuit. The control circuit has a Zener diode 44 with its cathode connected to the output conductor 42 and its anode connected to the other output conductor 40 via a voltage divider R1 and an RC filter network F1. The filter network F1 is comprised of a capacitor and resistor parallelly connected and prevents the Zener diode 44 from firing erratically due to transients. A wiper W for the voltage divider R1 is connected to the gate electrode 46 of a controlled rectifier 48. The anode and cathode of the controlled rectifier 48 are connected directly across a control winding 50 which is located about the portion 24c of the center leg 24.

The Zener diode 44 operates in a conventional manner and imposes a substantially open circuit until a critical breakdown voltage is reached; at this point the Zener diode 44 breaks down and becomes a low resistance short or closed circuit. The controlled rectifier 48 operates in a manner similar to a thyratron. When the gate electrode 46 is rendered positive relative to the cathode, such as to allow current to flow therebetween, upon application of a positive potential to the anode relative to the cathode, a current will then flow from anode to cathode. Once current flow from anode to cathode has been initiated, the gate electrode 46 can no longer control the conduction of the controlled rectifier 48 and hence the controlled rectifier 48 will continue to conduct until the positive potential between anode and cathode has been substantially removed. Once conduction has terminated, the controlled rectifier will not conduct from anode to cathode again until both the requisite current flow in the gate to cathode circuit occurs and a positive potential is applied to the anode relative to the cathode. Thus note that while the SCR 48 receives its trigger potential responsively to the potential appearing across the output load circuit (i.e., conductors 40 and 42) the anode-cathode circuit of the SCR 48 is a closed circuit including the control winding 50 which has a potential induced therein by the current through the primary winding 14.

Since the impedance of the closed circuit including SCR 48 and control winding 50 is low, the voltage induced in control winding 50 causes a current of high magnitude to flow in the closed circuit when the SCR 48 is in a conductive condition. Since the SCR 48 is an asymmetric current conducting device, the current flow in the closed circuit will be direct current and will occur only during portions of the alternate half cycles when the SCR 48 is capable of conduction. When current is flowing in the closed circuit a counter magnetomotive force is generated in the control winding 50. This M.M.F. is of sufficient magnitude to cause a drop in the M.M.F. oppearing across the secondary 16 resulting in a decrease in induced voltage. The longer the portion of the half cycle during which the SCR 48 conducts the greater the reduction is induced secondary potential. This, of course, is reflected in a reduction in direct potential at the output load circuit of the full wave rectifier 36. As the direct potential at the output load circuit tends to exceed the desired magnitude of that potential by a greater amount, the Zener 44 will be fired sooner hence triggering the SCR 48 sooner and appropriate compensation occurs. The converse is true as the magnitude of the potential at the output load circuit begins to drop. The desired potential at the output load circuit is selected relative to the expected range of input alternating potential variations such that the control circuit is substantially always operative for at least some portion of the alternate half-cycles. Thus in regulating the potential at the output load circuit the control circuit, via Zener 44 and SCR 48, is conducting for varying portions of the alternate half-cycles of the input alternating potential. The operating point of the SCR 48 can be selectively varied for different conditions by moving the wiper W along the poteniometer R1. Thus it can be seen that regulation of the potential at the output load circuit occurs automatically. This regulation is enhanced by the regulating characteristics of the transformer assembly 10.

While the operation of the control circuit has been described in conjunction with voltage variations occurring on the line it can be appreciated that the same discussion applies to voltage variations occurring as the result of variations in load. The shunt 32 disposed between the portions 24b and 24c of the center leg 24 is effective to divert some of the lines of flux through the center leg 24 and hence results in a lower induced voltage in the control winding 50 and hence a current of smaller magnitude in the control circuit. This permits use of a smaller wire size, etc., in control winding 50.

A filter network F2, comprising a capacitor connected in parallel to a resistor, is connected across the conductors 40 and 42 of the output load circuit and acts as a filter for the potential applied to the load; since Zener 44 is connected across filter F2, the filter F2 also aids in preventing spurious regulation and enables the Zener diode 44 and hence the SCR 48 to better follow load variations.

An alternate transformer assembly construction 10′ is shown in FIGURE 2; in the description that follows components having similar functions to like components in the transformer assembly 10 of FIGURE 1 will be given the same number with the addition of a prime. The transformer assembly 10′ of FIGURE 2 is substantially identical to the transformer assembly 10 of FIGURE 1 but differs therefrom in that all of the primary winding 14′ is wound upon the portion 24a′ of the center leg 24′. The connections of the secondary winding 16′ and of the control winding 50′ to the regulating circuit 12 would be the same as shown for transformer assembly 10 in FIGURE 1. The shunt 30′ is selected to remain substantially unsaturated over the operating range of the transformer assembly 10′. The transformer 10′, however, still has regulating characteristics. As the potential across the primary 14′ increases, a portion of the resulting increase in flux is shunted thereby reducing the effect on the induced secondary voltage.

While it will be apparent that the preferred embodiments of the invention disclosed are well calculated to fulfill the objects above stated, it will be appreciated that the invention is susceptible to modification, variation and change without deparing from the proper scope or fair meaning of the subjoined claims.

What is claimed is:

1. Apparatus for providing a regulated output potential from a source of alternating potential comprising: a transformer assembly and a regulating circuit, said transformer assembly comprising a primary winding connected to the source, a secondary winding, and magnetic core means for providing a magnetic circuit between said primary and secondary windings, said magnetic core means including a core member having a high permeability; said regulating circuit being connected to said secondary winding and comprising circuit means for providing an output potential having a magnitude varying in accordance with the magnitude of the potential at said secondary winding, said regulating circuit further comprising control means electrically connected to said circuit means and magnetically connected to said magnetic circuit and being responsive to said output potential for inducing a magnetomotive force in said magnetic circuit varying in magnitude in accordance with the variations in magnitude of said output potential and for correspondingly varying the resultant magnetomotive force across said secondary winding, whereby the magnitude of said output potential is maintained substantially constant, said magnetic circuit having a reluctance of a preselected magnitude which with the high permeability of said core member maintains said core member out of saturation.

2. Apparatus for providing a regulated output potential from a source of alternating potential comprising: a transformer assembly and a regulating circuit, said transformer assembly comprising a primary winding connected to the source, a secondary winding, and magnetic core means for providing a magnetic circuit between said primary and seconday windings, said magnetic circuit having a reluctance of a selected magnitude for maintaining said magnetic circuit out of saturation; said regulating circuit being connected to said secondary winding and comprising circuit means for providing an output potential having a magnitude varying in accordance with the magnitude of the potential at said secondary winding, said regulating circuit further comprising control means electrically connected to said circuit means and magnetically connected to said magnetic circuit and on selected half cycles of the alternating potential of the source being responsive to said output potential for inducing a magnetomotive force in said magnetic circuit varying in magnitude in accordance with the variations in magnitude of said output potential and for correspondingly varying the resultant magnetomotive force across said secondary winding, whereby the magnitude of said output potential is maintained substantially constant.

3. Apparatus for providing a regulated output potential from a source of alternating potential comprising: a transformer assembly and a regulating circuit, said transformer assembly comprising a primary winding connected to the source, a secondary winding, and magnetic core means for providing a magnetic circuit between said primary and secondary windings, said magnetic core means including a core member having a high permeability; said regulating circuit being connected to said secondary winding and comprising circuit means for providing an output potential having a magnitude varying in accordance with the magnitude of the potential at said secondary winding, said regulating circuit further comprising control means electrically connected to said circuit means and magnetically connected to said magnetic circuit and on alternate half-cycles of the alternating potential of the source being responsive to said output potential for inducing a magnetomotive force in said magnetic circuit varying in magnitude in accordance with the variations in magnitude of said output potential and for correspondingly varying the resultant magnetomotive force across said secondary winding, whereby the magnitude of said output potential is maintained substantially constant, said control means comprising a control coil located upon said magnetic core, a low impedance circuit connected across said control coil, and switch means for opening and closing said low impedance circuit responsively to the variations in magnitude of said output potential, said magnetic circuit having a reluctance of a preselected magnitude and said control means including said control coil having preselected electrical and magnetic characteristics which with the high permeability of said core member maintains said core member out of saturation.

4. Apparatus for providing a regulated output potential from a source of alternating potential comprising: a transformer assembly and a regulating circuit, said transformer assembly comprising a primary winding connected to the source, a secondary winding, and magnetic core means for providing a magnetic circuit between said primary and secondary windings; said regulating circuit being connected to said secondary winding and comprising circuit means for providing an output potential having a magnitude varying in accordance with the magnitude of the potential at said secondary winding, said regulating circuit further comprising control means electrically connected to said circuit means and magnetically connected to said magnetic circuit and being responsive to said output potential for inducing a magnetomotive force in said magnetic circuit varying in magnitude in accordance with the variations in magnitude of said output potential and for correspondingly varying the resultant magnetomotive force across said secondary winding whereby the magnitude of said output potential is maintained substantially constant, said control means comprising a control coil located upon said magnetic core, a low impedance circuit connected across said control coil, and switch means actuable on alternate half cycles of the alternating potential of the source for closing said low impedance circuit for intervals of said alternate half cycles varying in duration in accordance with the variations in the magnitude of said output potential, said switch means being responsive to a signal having its energy derived solely from the source.

5. Apparatus for providing a direct potential having a substantially constant magnitude from a source of alternating potential comprising: a transformer assembly and a regulating circuit, said transformer assembly comprising a primary winding connected to the source, a secondary winding, and magnetic core means for providing a magnetic circuit between said primary and secondary windings, said magnetic core means including a core member having a high permeability; said regulating circuit being connected to said secondary winding and comprising circuit means for providing a direct potential output having a magnitude varying in accordance with the magnitude of the alternating potential at said secondary winding, said circuit means including rectifying means for rectifying the alternating potential at said secondary winding, said regulating circuit further comprising control means electrically connected to said circuit means and magnetically connected to said magnetic circuit and being responsive to said direct potential output for inducing a magnetomotive force in said magnetic circuit varying in magnitude in accordance with the variations in magnitude of said direct potential output and for correspondingly varying the resultant magnetomotive force across said secondary winding whereby the magnitude of said direct potential output is maintained substantially constant, said magnetic circuit having a reluctance of a preselected magnitude which with the high permeability of said core member maintains said core member out of saturation.

6. Apparatus for providing a direct potential having a substantially constant magnitude from a source of alternating potential comprising: a transformer assembly and a regulating circuit, said transformer assembly comprising a primary winding connected to the source, a secondary winding, and magnetic core means for providing a magnetic circuit between said primary and secondary windings; said regulating circuit being connected to said secondary winding and comprising circuit means for providing a direct potential output having a magnitude varying in accordance with the magnitude of the alternating potential at said secondary winding, said circuit means including rectifying means for rectifying the alternating potential at said secondary winding, said regulating circuit further comprising control means electrically connected to said circuit means and magnetically connected to said magnetic circuit and being responsive to said direct potential output for inducing a magnetomotive force in said magnetic circuit varying in magnitude in accordance with the variations in magnitude of said direct potential output and for correspondingly varying the resultant magnetomotive force across said secondary winding whereby the magnitude of said direct potential output is maintained substantially constant, said control means comprising a control coil located upon said magnetic core, a low impedance circuit connected across said control coil, and switch means actuable on selected half cycles of the alternating potential of the source for closing said low impedance circuit for intervals of said selected half cycles varying in duration in accordance with the variations in the magnitude of said direct potential output, said switch means being responsive to a signal having its energy derived solely from the source.

7. The apparatus of claim 6 with said rectifier means comprising a full wave rectifier bridge having an input circuit for receiving the alternating potential from said secondary winding and an output circuit for providing the direct potential output, and with said switch means comprising a controlled rectifier device having a pair of principal electrodes and a gate electrode with said principal electrodes being connected across said control coil, a Zener diode having an anode and a cathode, and electrical circuit means connecting said Zener diode across said output circuit and said gate electrode to said anode of said Zener diode.

8. The apparatus of claim 7 with said electrical circuit means comprising a variable voltage divider connecting said gate electrode to said anode of said Zener diode.

9. The apparatus of claim 7 with said electrical circuit means comprising a filter network serially connected with said Zener diode.

10. The apparatus of claim 9 further including a filter network connected across said output circuit.

11. Apparatus for providing a direct potential having a substantially constant magnitude from a source of alternating potential comprising: a transformer assembly and a regulating circuit, said transformer assembly comprising a substantially continuous magnetic core, a primary winding located upon said core, a secondary winding located upon said core, said primary winding being split into first and second portions, and magnetic shunt means operative with said core and located between said first and second primary winding portions for providing a magnetic path for portions of the flux generated by said first and second primary winding portions and for diverting a portion of the flux generated by each of said first and second portions from the other; said regulating circuit being connected to said secondary winding and comprising circuit means for providing a direct potential output having a magnitude varying in accordance with the magnitude of the alternating potential at said secondary winding, said circuit means including rectifying means for rectifying the alternating potential at said secondary winding, said regulating circuit further comprising control means electrically connected to said circuit means and magnetically connected to said core of said transformer assembly and being responsive to said direct potential output for inducing a magnetomotive force in said core varying in magnitude in accordance with the variations in magnitude of said direct potential output and for correspondingly varying the resultant magnetomotive force across said secondary winding whereby a direct potential output having a substantially constant magnitude is provided, said control means comprising a control coil located upon said core, a low impedance circuit connected across said control coil, and switch means actuable on alternate half cycles of the alternate potential of the source for closing said low impedance circuit for intervals of said alternate half cycles varying in duration in accordance with the variations in the magnitude of said direct potential output.

12. The apparatus of claim 11 further including second magnetic shunt means operative with said core and located between said primary and secondary windings and said control coil for diverting a portion of the flux generated by said primary winding from said control coil.

References Cited

UNITED STATES PATENTS

| | | | |
|---|---|---|---|
| 2,675,515 | 3/1954 | Blashfield | 321—16 |
| 2,862,170 | 11/1958 | Hjermstad | 321—16 |
| 3,103,619 | 9/1963 | Du Vall. | |
| 3,200,328 | 9/1965 | Green | 321—18 |
| 3,207,975 | 9/1965 | Pintell | 321—16 |

JOHN F. COUCH, *Primary Examiner.*

M. L. WACHTELL, *Assistant Examiner.*